Aug. 11, 1931.   L. MAMBOURG   1,818,231
SHEET GLASS APPARATUS
Filed March 11, 1926    2 Sheets-Sheet 2

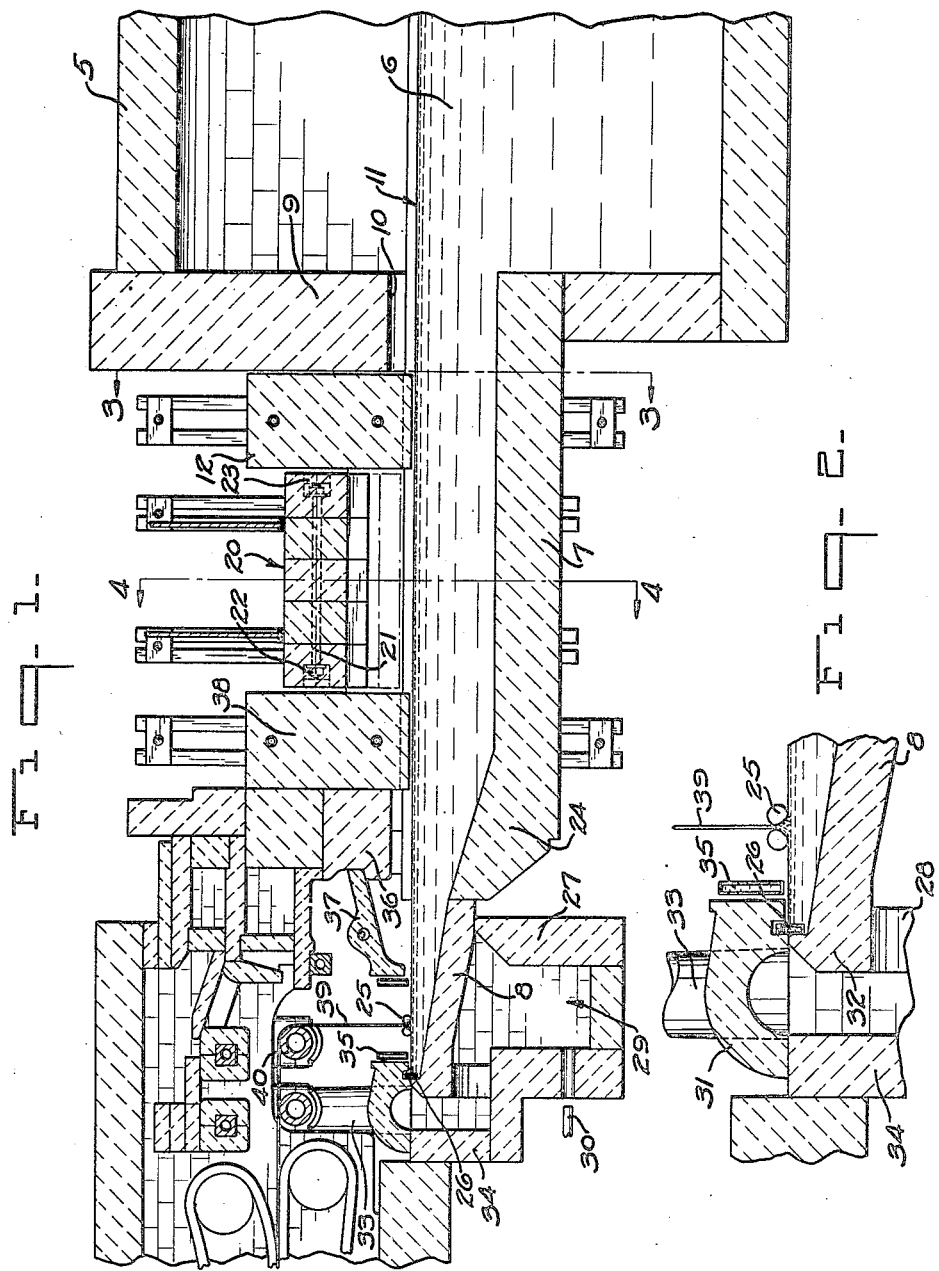

Inventor
Leopold Mambourg
By Frank Fraser,
Attorney

Patented Aug. 11, 1931

1,818,231

UNITED STATES PATENT OFFICE

LEOPOLD MAMBOURG, OF LANCASTER, OHIO, ASSIGNOR TO LIBBEY-OWENS-FORD GLASS COMPANY, OF TOLEDO, OHIO, A CORPORATION OF OHIO

SHEET GLASS APPARATUS

Application filed March 11, 1926. Serial No. 93,849.

The present invention relates to sheet glass apparatus.

An important object of the invention is to provide a sheet glass drawing apparatus wherein the temperature of the glass being drawn into the sheet is accurately controlled, permitting a flat uniform thickness of sheet to be drawn.

Another object of the invention is to provide a sheet glass apparatus, including a tank furnace and a cooling chamber associated therewith, the cooling chamber having a flat top so that the column of heated atmosphere above the glass in said cooling chamber will be the same height throughout the entire width of the flow of glass.

Another object of the invention is to provide an apparatus of this nature, including a cooling chamber in open communication with the tank furnace, the heated atmosphere in the cooling chamber and the atmosphere in the tank furnace being separated by means of an adjustable jack-arch.

Still another object of the invention is to provide an apparatus for producing sheet glass, wherein a tank furnace is adapted to contain a mass of molten glass, said tank furnace having a cooling chamber and a drawing chamber associated therewith, the cooling chamber having a flat adjustable top and being provided with adjustable jack-arches to separate the heated atmosphere above the glass in the cooling chamber from the atmosphere above the glass in the tank furnace.

A further object of the invention is to provide a sheet glass producing apparatus, wherein a draw pot is used having an inclined bottom of a nature that the pot may be supported at its ends only, the inclined bottom preventing accumulation of stagnant glass in its end.

Other objects and advantages of the invention will become apparent during the course of the following description.

Figure 3:
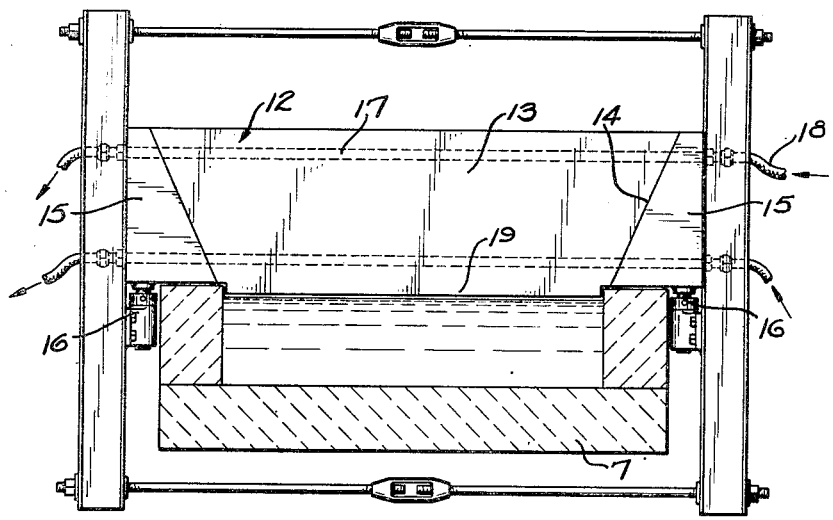
Figure 4:
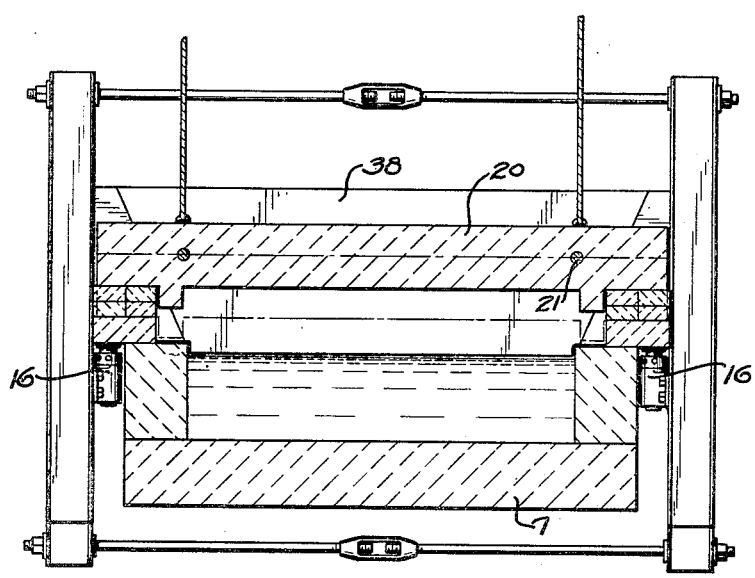

In the drawings wherein like numerals are employed to designate like parts throughout the same, Fig. 1 is a vertical longitudinal section through my improved construction, Fig. 2 is a detail of a portion thereof, Fig. 3 is a section taken on line 3—3 in Fig. 1, and Fig. 4 is a section taken on line 4—4 in Fig. 1.

In the production of sheet glass the temperature treatment of the molten glass is of vital importance. The glass must pass from a highly heated molten state to a condition where it can be drawn or formed into a sheet. The present invention has particular reference to the Colburn type of machine, wherein a sheet is continuously drawn from the surface of a mass of molten glass, although of course it is not necessarily limited to the machine. In the Colburn machine the molten glass is produced in a tank furnace, after which it is permitted to become refined, passed through a cooling chamber and into a drawing receptacle from where it can be drawn away in sheet form. Heretofore in this machine the heated atmosphere in the tank furnace has been permitted to pass into the cooling chamber so that any fluctuations in the tank furnace will be transmitted to the cooling chamber, sometimes causing detrimental effects upon the glass being treated in said chamber. It is of great importance that the treatment of the glass be uniform throughout the width of the flow as any inequalities in temperatures of the glass transversely thereof cause trouble in the sheet. It has been customary to provide the cooling chamber with an arched top, thus permitting a greater heating of the sheet centrally than at the edges, as the arched top has a tendency to concentrate the heat rays centrally thereof.

In the present apparatus, the numeral 5 designates a tank furnace containing a source of molten glass 6. A cooling chamber 7 is arranged in open communication with the tank furnace 5, which in turn is in open communication with a draw-pot 8.

A wall 9 is provided between the tank furnace and the cooling chamber. The lower end 10 of this wall has heretofore been, and is in the present case, arranged relatively far away from the surface 11 of the molten glass. In the improved construction, an adjustable jack-arch 12 is provided. This adjustable jack-arch is more clearly shown in Fig. 3, wherein a preferably refractory clay slab member 13, having bevelled ends 14, is supported by means of the preferably metallic wedge members 15, adjustably supported by means of the jack members 16. Pipes 17 are run through the wedge members and slab member, as shown in Fig. 3, and preferably have connection 18 with some form of cooling medium. The slab 17 is provided with the downwardly extending projection 19, which permits the lower edge thereof to be brought very close to the surface of the glass flowing thereunder. By adjusting the jacks 16 to raise and lower the slab 13, it is possible to cut out as much or to permit any desired amount of heated atmosphere from passing into the cooling chamber.

The top 20 of the cooling chamber is flat and preferably adjustable. As illustrated in Fig. 1, the top 20 comprises a plurality of sections of slabs held together by means of the bar 21 passing therethrough, the ends of which carry the nuts 22. The end blocks may be countersunk so that the nuts 22 may be covered up by suitable bricks 23, thus preventing dirt and the like from falling into the glass, and also to protect the same from heat.

The end of the cooling chamber 7 terminates in a so-called gooseneck 24, which abuts the draw-pot 8. The draw-pot in the Colburn machine has a flat bottom, so that the depth of glass contained therein is uniform. It has been found that with this type of pot, glass accumulates and becomes stagnant between the sheet source 25 and the end of the pot. As the glass is stagnant it soon becomes devitrified, forming what is known as dog-metal. After a certain amount of dog-metal has accumulated, it is necessary to stop the drawing operations and boil out this dog-metal as it begins to break loose and pass into the sheet.

As an accumulation of glass takes place, it seems obvious that a greater amount of glass is permitted to flow to the rear of the pot than is required, otherwise the glass would not become stagnant.

In the present invention the bottom of the draw-pot 8 is inclined so that the closed end is much more shallow than the open end. In addition, the pot is shortened so that the sheet source 5 is arranged relatively much closer to the closed end of the pot than heretofore. By inclining the bottom of the pot, and by moving the sheet source nearer the closed end, the amount of glass permitted to flow toward the closed end, although slightly in excess of the amount needed, is not enough to permit stagnation. If the glass in the closed end is being continuously moved, the formation of dog-metal is much less likely to take place. To further insure against the formation of dog-metal, a suitable tube 26 may be provided through which suitable heating or cooling means may be passed to control the temperature of the glass.

To further permit a better control of the temperature of the glass in the draw-pot, it is possible with the present construction to support it at its ends only. The open end may be supported upon the block 27, while the other end may be supported upon the arch 28. A chamber 29 is thus formed beneath the draw-pot which may be heated to the desired temperature, and as no pot stools or other forms of support are used, except at the ends of the pot, an even uniform application of heat may be had beneath the said pot. A burner or the like 30 may be used to heat the chamber 29, the heat passing up through the arch 28, striking the lip-tile 31, which spreads the heat and exhaust gases out along the end 32 of the pot, where they can pass out through a stack 33. The lip-tile 31 differs from the form of lip-tile now used. The front end of the lip-tile is supported upon the end of the pot 8, while the opposite end rests upon a block 34, forming the tunnel through which the exhaust gases pass, as has been pointed out. The sheet coolers 35 may be used as heretofore.

In addition to the jack-arch 36, shown in Fig. 1, which supports the rear end of the lip-tile 37, a second adjustable jack-arch 38 is used to separate the cooling chamber from the drawing chamber. The jack-arch 38 may be similar to the jack-arch 12 in construction and operation.

In operation, the molten glass is produced in the tank furnace 5, after which it is permitted to pass through the cooling chamber 7. By properly adjusting the jack-arch 12, the desired amount of heated gases can be permitted to pass with the glass from the furnace into the cooling chamber. The flat top 20 can also be adjusted to obtain the best results. The glass flows from the cooling chamber into the drawing chamber, where it may be dawn from the pot 8 in the form of a sheet 39. The sheet may be deflected over a bending member 40 into the horizontal plane as is well understood in the art. The second adjustable jack-arch 38 may be adjusted to the desired position. If the jack-arches 12 are arranged relatively close to the surface of the molten glass, it is possible to maintain a constant uniform condition in the cooling chamber. Oftentimes it is found necesary to vary temperature conditions in the tank furnace, and obviously where the cooling chamber and tank furnace are not separated these changes will be transmitted thereto, which oftentimes cause trouble. By separating the cooling chamber and drawing chamber from the tank furnace, any changes in the tank furnace will be less likely to influence conditions in the cooling chamber and drawing chamber.

By establishing the proper conditions and maintaining such conditions, the problem of producing a uniformly flat and high quality of sheet are made much easier.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a tank furnace containing a mass of molten glass, a draw pot communicating therewith for receiving the molten glass therefrom and having a closed outer end, a lip tile disposed above the molten glass and having its front end supported on the closed end of the draw pot, means for supporting the outer end of the lip tile and cooperating with said lip tile to form a tunnel therebeneath, a heating chamber disposed beneath the draw pot and in communication with the said tunnel, means for heating said chamber, and a stack also in communication with said tunnel for drawing the exhaust gases therefrom.

2. In sheet glass apparatus, a tank furnace containing a mass of molten glass, a draw pot communicating therewith for receiving the molten glass therefrom and having a closed outer end, a lip tile disposed above the molten glass and having its front end supported on the closed end of the draw pot, means for supporting the outer end of the lip tile and cooperating with said lip tile to form a tunnel therebeneath, a heating chamber disposed beneath the draw pot and in communication with the said tunnel, means for heating said chamber, a stack also in communication with said tunnel for drawing the exhaust gases therefrom, and temperature control means positioned beneath the lip tile and partially immersed within the molten glass.

Signed at Lancaster, in the county of Fairfield, and State of Ohio, this 8th day of March, 1926.

LEOPOLD MAMBOURG.